(12) United States Patent
Foege

(10) Patent No.: US 9,243,860 B2
(45) Date of Patent: Jan. 26, 2016

(54) LASER TRAINING SHOOTING DEVICE FOR A FIREARM

(71) Applicant: Robert Louis Foege, Newtown, CT (US)

(72) Inventor: Robert Louis Foege, Newtown, CT (US)

( * ) Notice: Subject to any disclaimer, the term of this patent is extended or adjusted under 35 U.S.C. 154(b) by 0 days.

(21) Appl. No.: 14/682,243

(22) Filed: Apr. 9, 2015

(65) Prior Publication Data

US 2015/0267991 A1    Sep. 24, 2015

Related U.S. Application Data

(63) Continuation-in-part of application No. 13/933,420, filed on Jul. 2, 2013.

(51) Int. Cl.
*F41A 33/02* (2006.01)
*G09B 19/00* (2006.01)

(52) U.S. Cl.
CPC ................ *F41A 33/02* (2013.01); *G09B 19/00* (2013.01)

(58) Field of Classification Search
CPC ......... F41A 33/00; F41A 33/02; F41A 33/04; F41A 33/06; G09B 19/00
See application file for complete search history.

(56) References Cited

U.S. PATENT DOCUMENTS

| | | | | |
|---|---|---|---|---|
| 5,685,106 | A * | 11/1997 | Shoham | F41G 1/35 42/116 |
| 5,909,951 | A * | 6/1999 | Johnsen | F41A 33/02 362/111 |
| 6,151,788 | A * | 11/2000 | Cox | G01B 11/27 33/286 |
| 2002/0129536 | A1* | 9/2002 | Iafrate | F41A 33/02 42/134 |

* cited by examiner

*Primary Examiner* — Timothy A Musselman
(74) *Attorney, Agent, or Firm* — Mark E. Pochal

(57) ABSTRACT

A laser training shooting device adaptable for use in varying caliber barrels of a firearm insertable in said barrels simulating firing of the firearm without actuation of a trigger or a firing pin of the firearm. The laser device consisting of: a laser module composed of a transmitting assembly and optics package; a spud adapter in communication with the laser module, said spud adapter having contact beads for frictional engagement and alignment within said firearm barrel; and, an electrical lead having a means of attachment at a first end to the laser module and a micro-switch disposed within a trigger ring or a trigger hook at a second end positioned at the trigger of said firearm. The laser device being activated by pressing the micro-switch causing the emission of a laser light from the laser module.

8 Claims, 6 Drawing Sheets

LASER TRAINING SHOOTING DEVICE FOR A FIREARM

PRIORITY CLAIM

This application claims priority to and is a continuation-in-part of application Ser. No. 13/933,420 entitled a laser training shooting device for a firearm and filed on Jul. 2, 2013.

FIELD OF THE INVENTION

The present invention consists of a laser firearm training device interchangeable for use within a barrel of a firearm of varying calibers and models, such as, pistols, handguns, shot guns and other firearms, for simulation of the operation of said firearm to develop marksmanship, efficiency, and general safety and training in handling of the firearm. In particular, the present invention consists of a laser device disposed within the barrel of the firearm causing the emission of a laser light pulse along the longitude axis of the barrel toward a target. The laser light pulse activated by a micro-switch positioned at a trigger of the firearm connected by an electrical lead to the laser device.

BACKGROUND OF THE INVENTION

In law enforcement or military training, competition target shooting, sport hunting, tactical and instinct training, sighting in a firearm or other uses, the accurate shooting of a firearm is essential. Of equal importance, is the safety in handling the firearm for the protection of yourself and others. In order to become a proficient, accurate, safe and successful firearm expert or enthusiast, repetitive shooting of the firearm is required to develop the proper techniques and muscle memory allowing operation to be second nature.

The repetitive shooting necessary to achieve the above objectives is limited by the use of live ammunition. It is well known the cost of live ammunition is expensive and a limiting factor. Additionally, the need to use designated firing ranges is a major inconvenience not to mention the safety concerns involved with the use of live ammunition especially when dealing with novices in firearm shooting.

It is well known in the prior art of training systems utilizing laser devices for simulating firearm operation without needing live ammunition in attempt to overcome the limiting factors mentioned above. In U.S. Pat. No. 6,935,864 B2 (Shecter et al.) a laser transmitting assembly consisting of a cartridge adapter assembly and modified blanks having a quantity of a explosive substance is disclosed. The laser transmitter assembly is actuated by pulling the trigger of the firearm causing the explosive substance in the modified blanks to create a gas which transverses the barrel of the firearm. The laser assembly senses this actuation causing the emission of a laser pulse. This prior art device is limited by the cost factor and need for modified blank cartridges and the use of a limited quantity of an explosive substance. U.S. Pat. Nos. 5,140,893, 5,433,134 and 5,585,589 (Edward J. Leiter), each disclose fire simulating devices that consist of utilizing blank cartridges to activate the transmission of a laser beam.

In U.S. Pat. No. 3,633,285 (Sesney), U.S. Pat. No. 3,938,262 (Dye et al.), and U.S. Pat. No. 3,995,376 (Kimble et al.) each, also, disclose a laser system to simulate firearm operation. These patents disclose the use of a acoustical transducer or piezoelectric crystal in the laser system activating the laser device by the detection of sound energy or a mechanical force or shock wave from actuation of the firearm firing mechanism. In these prior art devices actuation of the laser system requires the actual firing of the firearm or squeezing of the firearm trigger in combination with the use of blank cartridges or "dry" firing of the firearm. The abundant repetitive firing of the firearm to achieve proficiency in use and marksmanship of the firearm will cause deterioration of the firearm firing mechanism ultimately affecting the longevity of the firearm. Additionally, the repetitive firing of the firearm will cause exhaustion to the user reducing the length of training sessions. Additionally, the prior art device disclosed in U.S. Pat. No. 4,761,907 (Carlo De Bernardini) consists of a shock detector controlling the release of the laser light by actuation of the firing mechanism of the firearm.

Furthermore, as disclosed in U.S. Pat. Publication US 2003/0003424 A1 (Shechter et al.) the firearm must be altered to accommodate the laser system device. More specifically, in this patent, disclosed is a training barrel that is a drop-in replacement barrel for a pistol having a removable barrel. U.S. Pat. No. 5,842,300 (Cheshelski et al.) discloses a laser system that requires replacement of the entire pistol barrel with a barrel containing a laser module.

The present invention addresses the disadvantages of the prior art, namely the necessity for use of blank cartridges or modified cartridges containing a limited amount of explosive substance. Furthermore, the need in some of the disclosed prior art devices to modify the firearm to accommodate the laser system. Finally, the need to fire the firing mechanism of the firearm to activate the laser device which over time and abundant repetitive firing will wear down the firing mechanism affecting longevity and usefulness of the firearm.

OBJECTS AND SUMMARY OF THE INVENTION

Accordingly, it is an object of the present invention to simulate operation of a firearm for repetitive shooting of the firearm.

It is another object of the present invention to provide a device that allows repetitive shooting for training or other purposes without the use of expensive and dangerous live ammunition.

It is another object of the present invention to provide a device that permits repetitive shooting in any place including the user's residence, at any time, and eliminate the need and inconvenience to travel to firing ranges or other designated areas.

It is another object of the present invention to provide a laser device for simulation of firing a firearm without the use of blank or modified cartridges.

Furthermore, it is another object of the present invention to provide a laser system device that is used in a barrel of the firearm and is interchangeable to accommodate various calibers and barrel sizes of the firearm.

Furthermore, it is another object of the present invention to provide a firing simulating device which does not require any modification or adaptation of the firearm.

Yet, it is another object of the present invention to provide a firing simulating device that does not require the activation of the firearm's firing mechanism eliminating excessive wear on the firearm from repetitive use.

Yet, it is another object of the present invention to provide a firing simulating device utilizing a laser system that is activated by a micro-switch contained within a trigger ring worn on a user's trigger finger or positioned on the firearm trigger.

Yet, it is another object of the present invention to provide a firing simulating device allowing practice and/or training anywhere for benign target practice for sight and trigger control, tactical and instinct practice and training in any environment lighted or dark.

Yet, it is another object of the present invention to provide a firing simulating device for training new shooters frequently intimidated by the firearm, noise or recoil and eliminate exhaustion from too much recoil from the many repetitions necessary to develop the proper muscle memory to become accurate and proficient with the firearm for competitive or sport shooting or use in military or law enforcement.

According to the present invention, a firearm laser device includes: a laser module; a laser transmitting device disposed within the laser module, said transmitting device consisting of a power source and optics package; a spud device having a cone housing at a first end for communication with the laser module, a spud stem and a cylindrical spud adapter at a distal second end of the spud device, said spud adapter disposed within a barrel of a firearm by frictional force by a plurality of contact beads disposed in a the spud adapter; and, a micro-switch contained within a trigger ring at one end of an electrical lead and a hoop attachment at a second end in communication with the laser module, said laser transmitter device being activated by pressing the micro-switch against a trigger of said firearm causing the emission of a laser light pulse from the optics package distally from the barrel towards a target.

An alternative embodiment of the present invention discloses a spud device having a cone housing at a first end for communication with the laser module; a spud stem having a plurality of contact beads disposed within the spud stem at a location distal to the cone housing, the contact beads providing a frictional force when disposed within the barrel of a pistol firearm for alignment of the spud device.

The aforesaid objects may be achieved individually or/and in combination, and it is not intended that the present invention be construed as requiring two or more of the objects to be combined unless expressly required by the claims attached hereto.

The foregoing and other objectives, features, and advantages of the invention will be more readily understood upon consideration of the following detailed description of the invention will be more readily understood upon consideration of the following detailed description of the invention, taken in conjunction with the accompanying drawings.

DETAILED DESCRIPTION OF THE PREFERRED EMBODIMENTS

Figure 1:
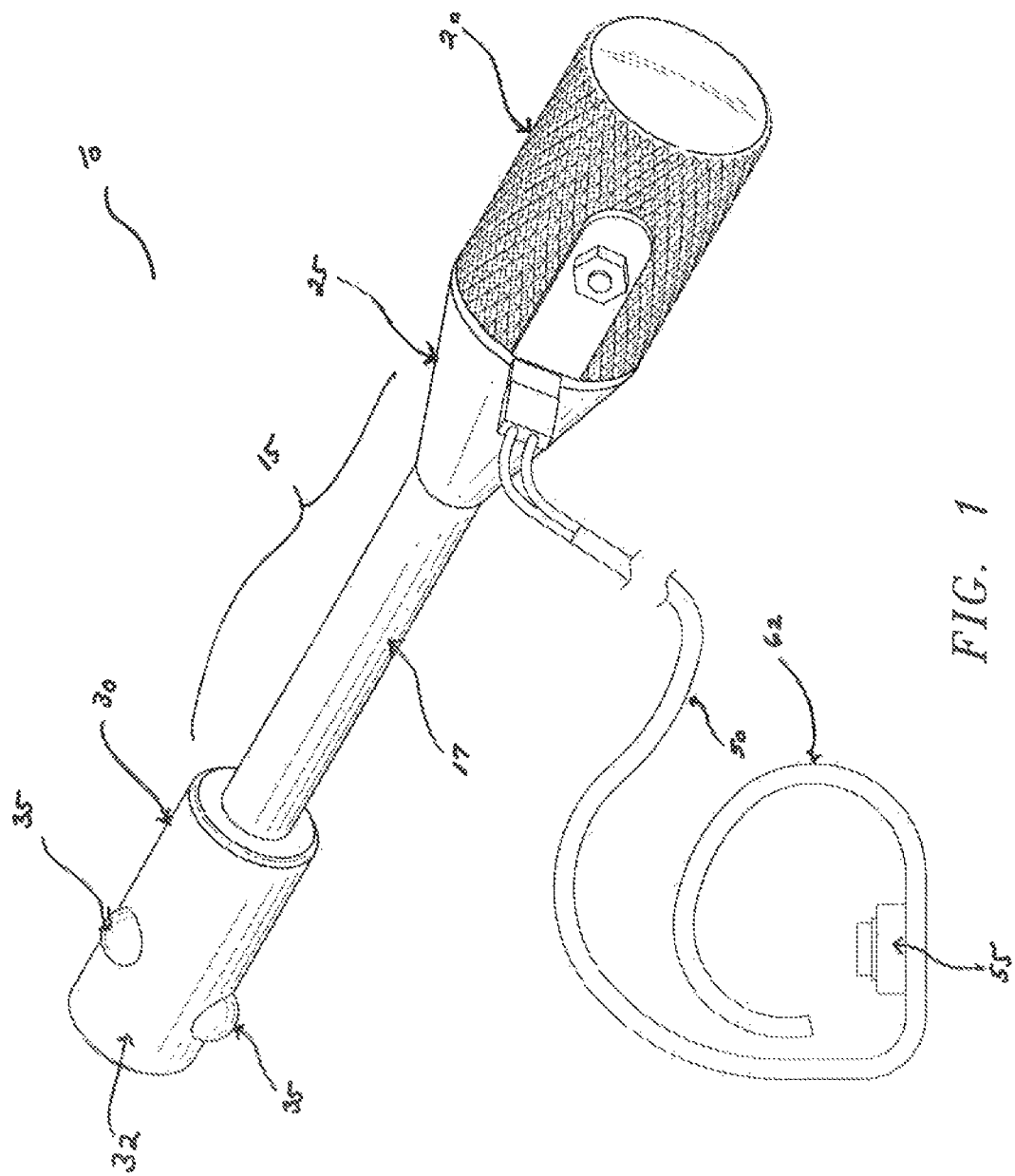
FIG. 1 is a perspective view of a laser firearm training device activated by a micro-switch attached by an electrical lead.
Figure 3:
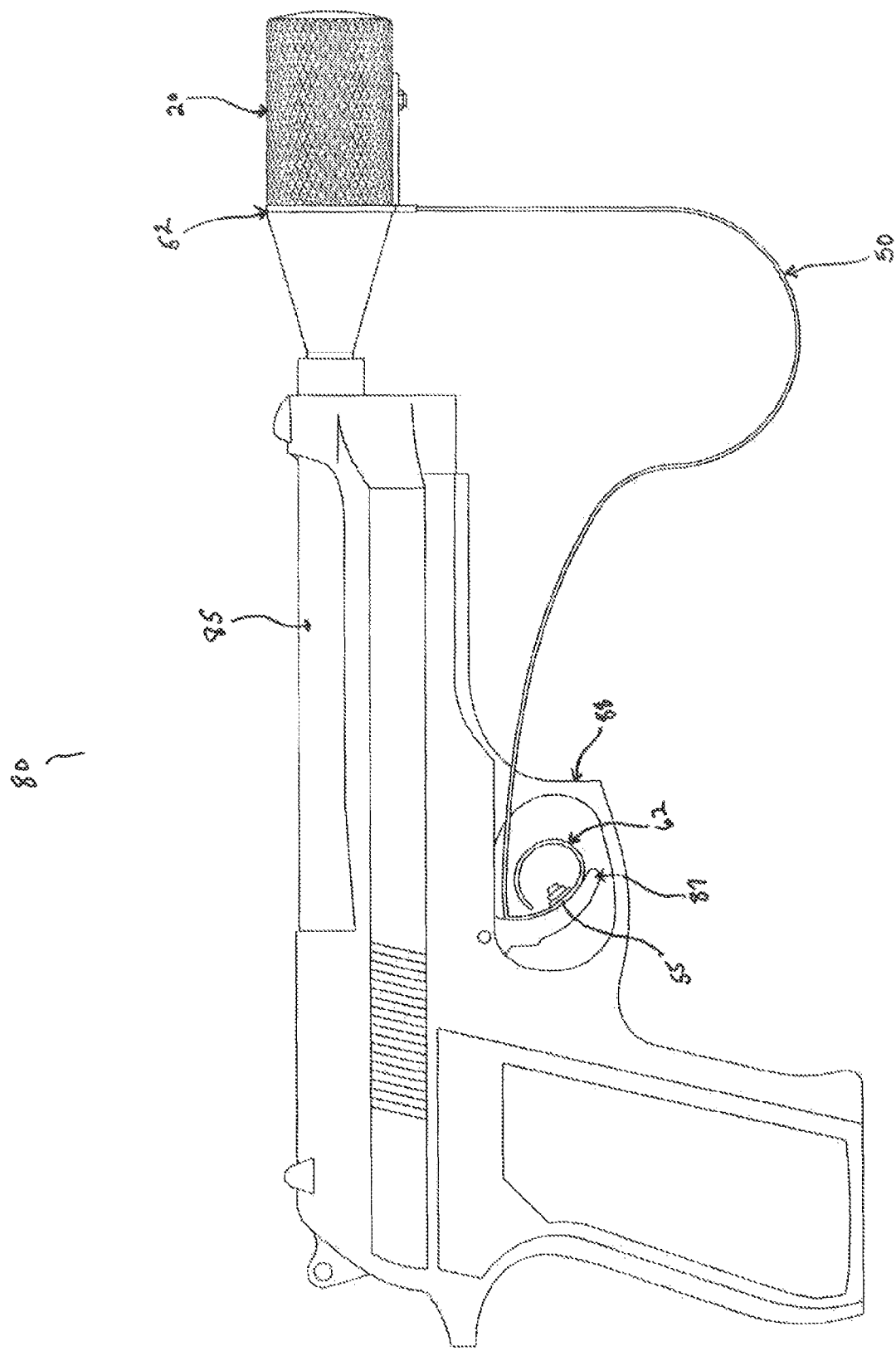
FIG. 3 is a perspective view of a pistol with a laser firearm device inserted within the barrel of the pistol and a micro-switch disposed within a trigger ring positioned in the area of a trigger of the pistol and an electrical lead connecting the micro-switch to the laser module.
Figure 4:
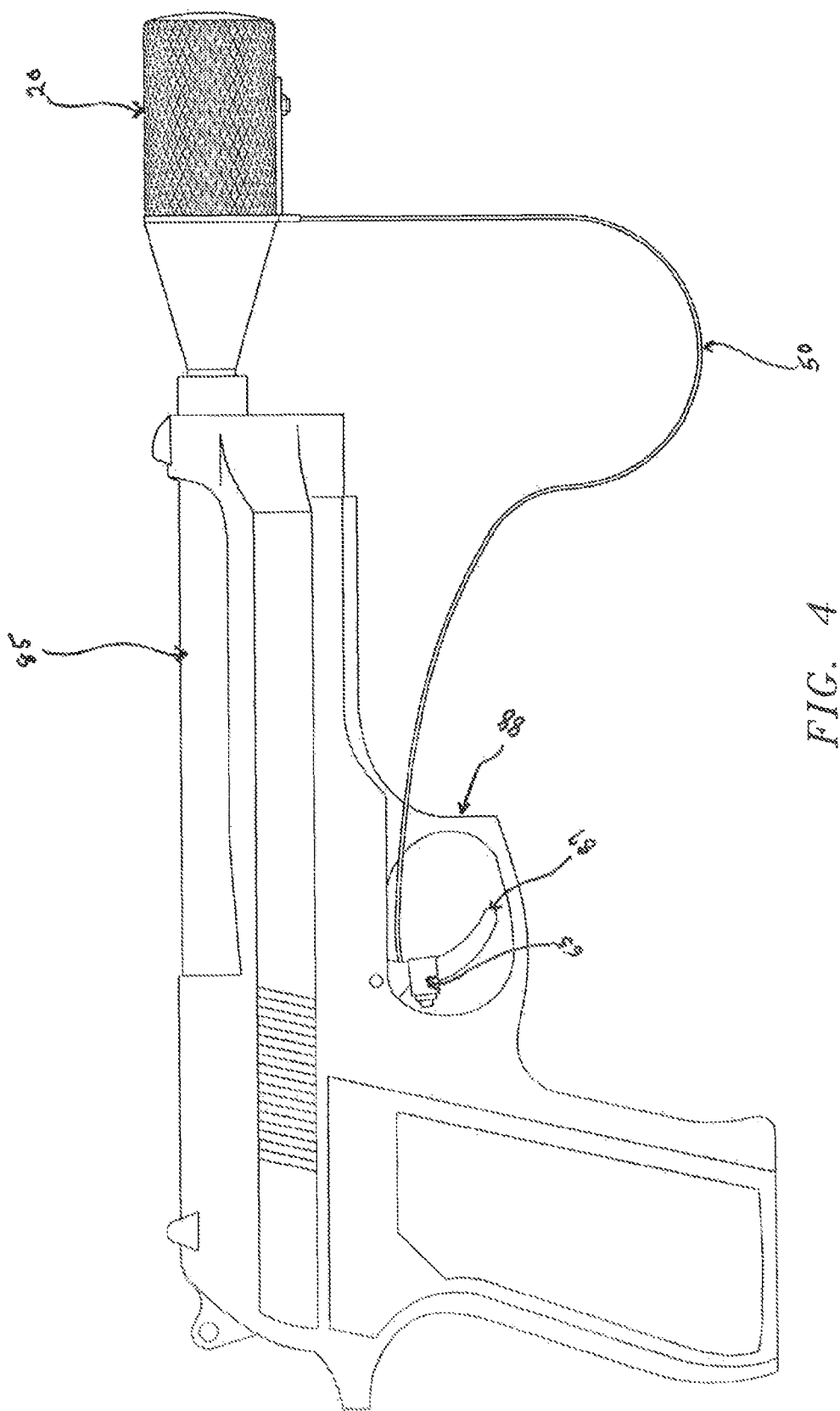
FIG. 4 is a perspective view of an alternative embodiment of a pistol having the micro-switch attached to the trigger of a pistol by a trigger hook attachment.
Figure 5:
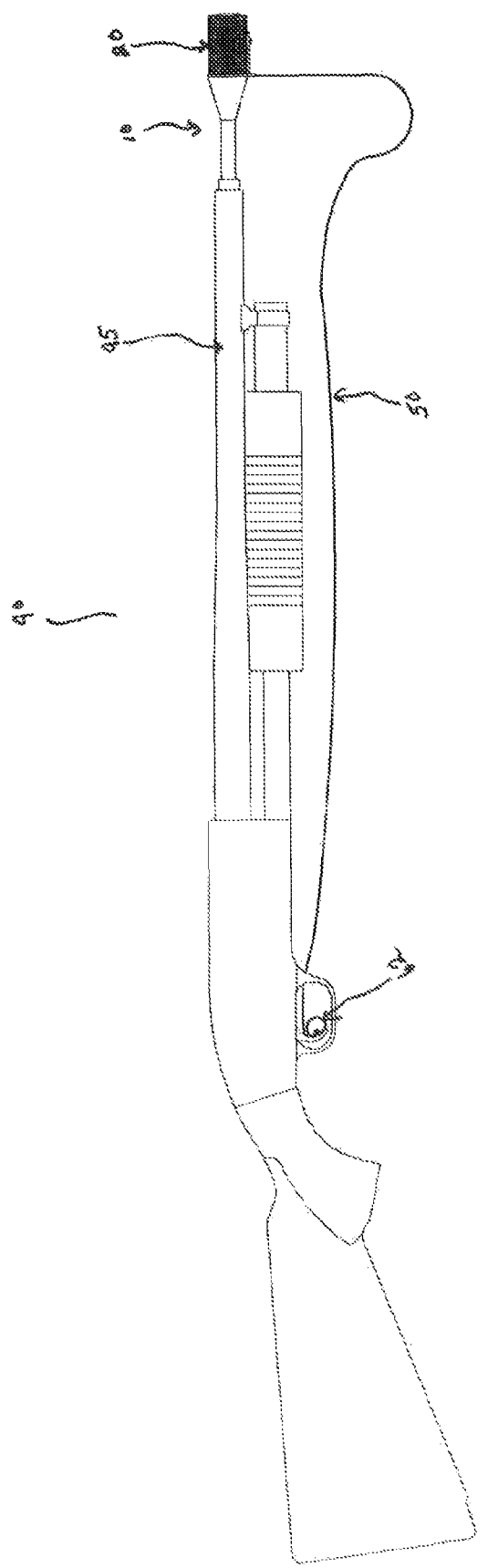
FIG. 5 is a perspective view of a shot gun with a laser firearm device inserted with the barrel and a micro-switch positioned at the trigger of the shotgun and attached to a laser module by an electrical lead.

A laser firearm training device according to the present invention is illustrated in FIG. 3 and FIG. 5. Specifically, the laser firearm training device (10), depicted in FIG. 1, is inserted into a barrel (85) of a firearm such as a pistol (80), as illustrated in FIG. 3. Likewise, the laser firearm training device (10) is inserted into the barrel (95) of a shotgun (90), as illustrated in FIG. 5.

Figure 2:
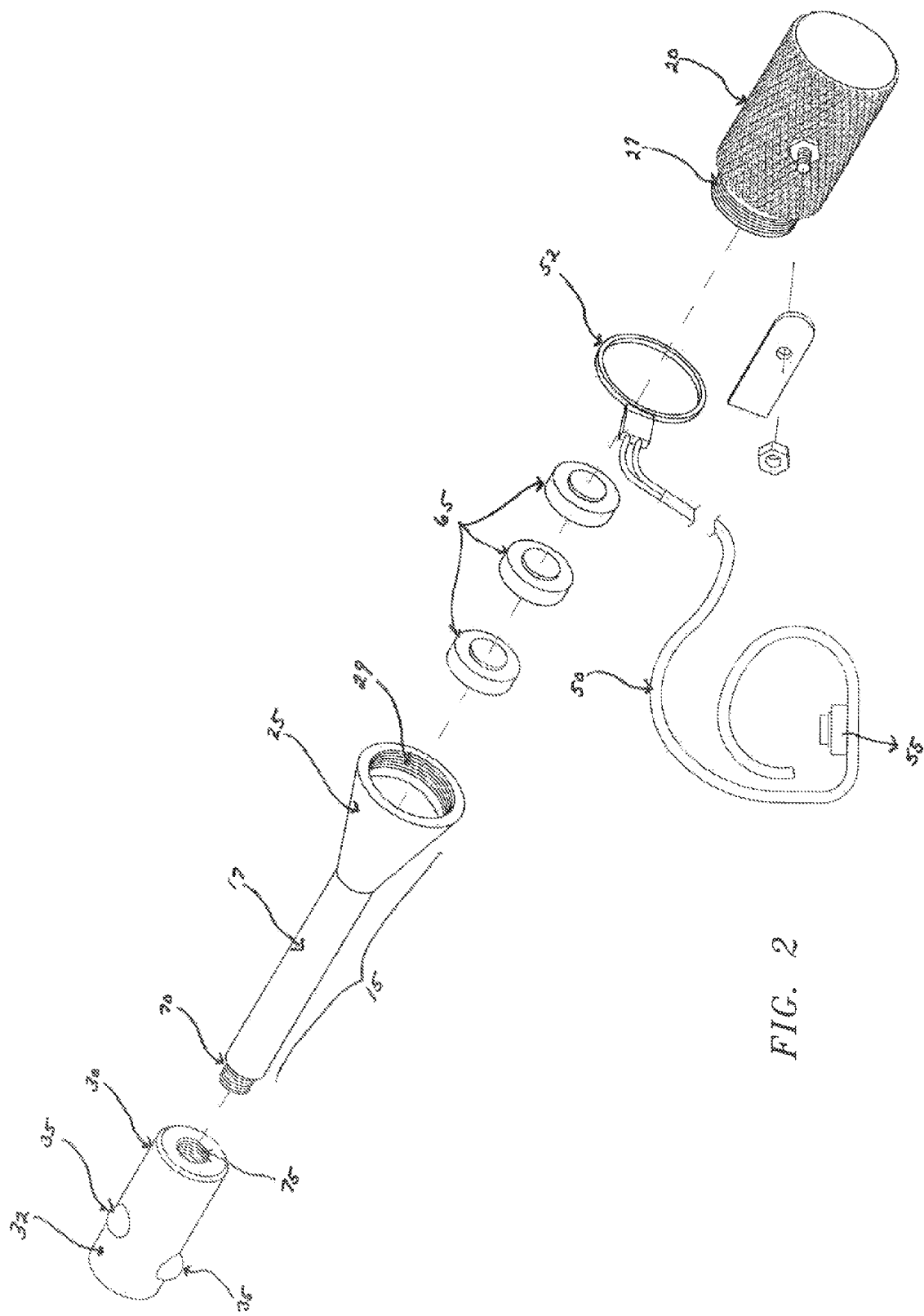
FIG. 2 is a perspective view of various components of a laser firearm training device comprising a laser module, a hoop configuration for a means of attaching a micro-switch disposed within a electrical lead, a plurality of button batteries, a spud adapter with a interchangeable cylindrical spud base.

A preferred embodiment of the laser firearm training device of the present invention for simulating operation of the firearm without the need to activate the firing mechanism of the firearm or operation without the use of blank cartridges or modified cartridges partially containing explosive substance is depicted in FIGS. 1 and 2. The laser firearm training device includes a laser module (20). The laser module (20) is attached to a spud adapter (15) which is inserted into the barrel (85) of the firearm. (80) The spud adapter (15) consists of a cone shaped tip (25) with an internal thread configuration (29) on an inner wall attached to spud stem (17) and a cylindrical base (30) distal from the cone shaped tip (25).

The cylindrical base (30) having a plurality of contact beads (35) disposed within an outer wall (32) of the base (30). The contact beads (35) are arranged in a helical configuration to ensure proper alignment of the laser firearm training device (10) when inserted in firearm barrel (85).

The laser module (20) consists of a housing having an external threaded opening (27) defined in a rear wall of the laser module (20). Disposed within the laser module (20), not shown, is a transmitting device which includes an optics package and a lens for emitting a laser light pulse distally from the barrel (85). Additionally, disposed with the laser module (20) in communication with spud adapter cone tip (25), as illustrated in FIG. 2, is a power source. In a preferred embodiment, the power source consists of a plurality of button batteries (65).

The laser module (20) is connected to the spud adapter (15) by engagement of the external threads (27) with the internal threads (29) defined in the cone shaped tip (25). The laser module (20) and spud adapter (15) are inserted into the barrel (85) of the firearm (80) and frictionally engaged by the contact beads (35) of cylindrical base (30).

An electrical lead (50) consists of a first end having an attachment means to the laser module (20). In a preferred embodiment, the attachment means consist of a hoop configuration (52) engaged around the external threads (27) of laser module (20) and is sandwiched between the laser module (20) and spud adapter (15) by engagement of the external threads (27) of laser module (20) with the internal threads (29) of cone shaped tip (25). The electrical lead (50) having a trigger ring (62) at a second end. The trigger ring (62) having a micro-switch (55) disposed within trigger ring (62). The trigger ring (62) is adjustable to fit around a trigger finger of a firearm user.

The activation of the laser module (20) causing emission of a laser light pulse is effected by pressing the micro-switch (55) against a trigger (87) of a firearm (80) creating contact with the button batteries (65) activating the transmitting device disposed in laser module (20).

In FIG. 2, an alternative embodiment is illustrated in which a interchangeable spud adapter cylindrical base (30) is utilized for accommodating various caliber barrels of differing firearms. In this embodiment, the spud adapter stem (17) contains an externally threaded stud insert (70) distally from cone shaped tip (25). The spud adapter cylindrical base (30) contains an internally threaded configuration (75) for engagement with stud insert (70). The spud adapter cylindrical base (30) consists of varying size circumferences to accommodate multiple caliber sizes of differing firearm barrels.

In FIG. 1 an alternative embodiment is illustrated wherein the micro-switch (55) is disposed on a trigger hook (60) for attachment onto a trigger guard (88) positioning the micro-switch (55) in communication with the trigger (87) of firearm (80).

Figure 6:
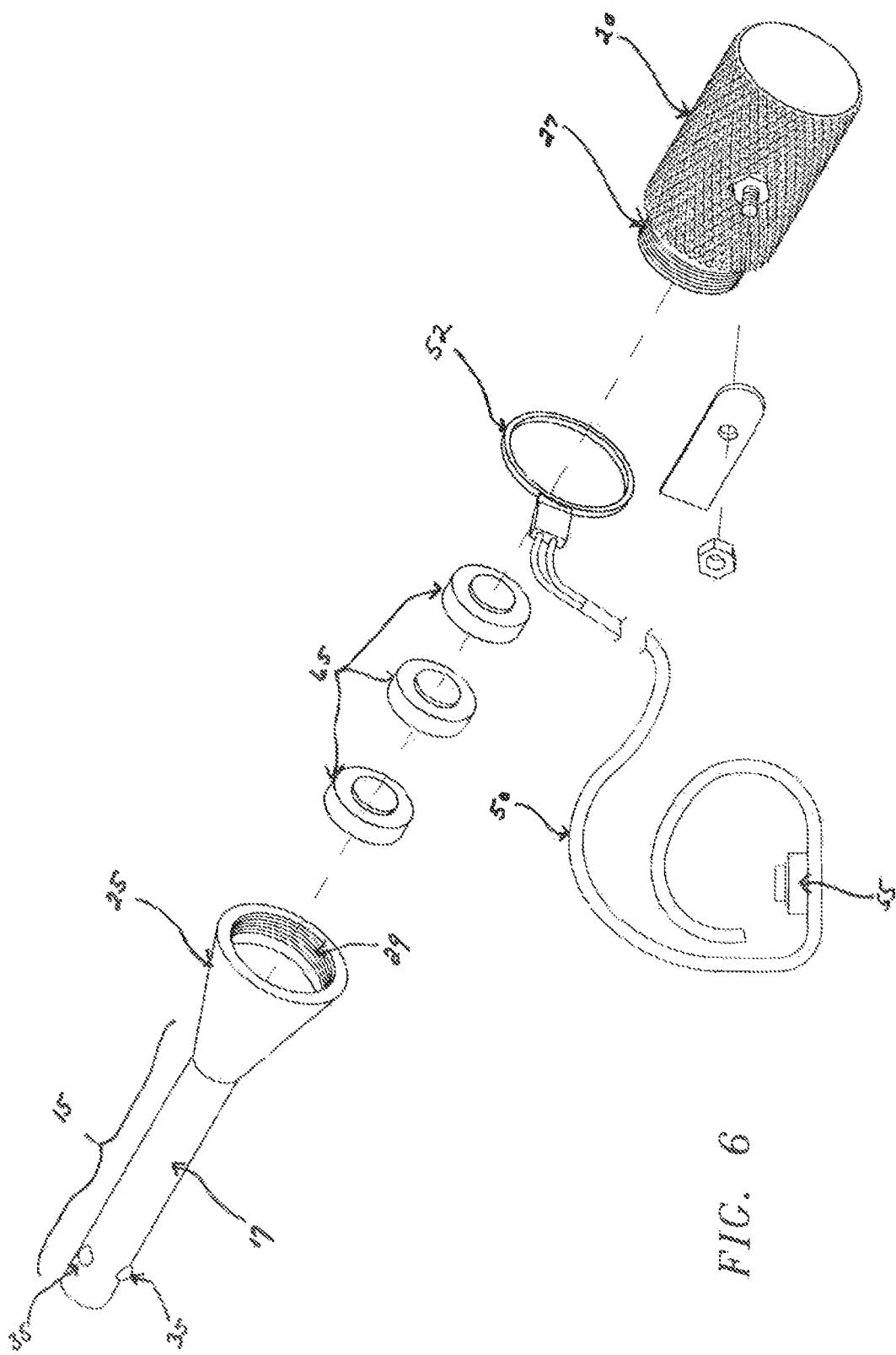
FIG. 6 is a perspective view of an alternative embodiment of the spud adapter and laser module assembly in which the contact beads are contained within the spud adapter for frictional alignment within a barrel of a pistol firearm.

In FIG. 6, an alternative embodiment is illustrated of the laser training shooting device for use in pistol firearms. Laser module (20) is contained within spud adapter (15) at the cone shaped tip (25). Contact beads (35) are contained within spud stem (17) at the distal end from the cone shaped tip (25) for frictional containment and alignment within a barrel of a pistol firearm. Spud stem (17) consists of multiple circumferential sizes adaptable for use in varying caliber pistol firearms.

What is claimed is:

1. A laser firearm device insertable into a barrel of a handgun for simulating operation of the handgun comprising:
    a laser module consisting of a housing having a externally threaded opening defined in a rear wall of the housing;
    a transmitting assembly disposed within the laser module, said transmitting assembly consisting of a power source and an optics package causing emission of a laser light pulse distally through a lens;
    a spud adapter having a cone shaped tip with an internally threaded configuration for communication with the externally threaded laser module opening, and
    an elongated stem having a plurality of contact beads disposed within an outer wall distally from the laser module for frictional engagement within the barrel of said handgun; and
    an electrical lead having an attachment means at a first end sandwiched between the laser module and spud adapter cone tip, and a micro-switch at a second end in communication with a trigger of the handgun causing emission of the laser light pulse by pressing the micro-switch creating contact with the power source of the transmitting assembly.

2. The laser firearm training device of claim 1, wherein said power consists of plurality of button batteries.

3. The laser firearm training device of claim 1, wherein the elongated stem of the spud adapter consists of multiple circumferential sizes to accommodate multiple barrel sizes of differing calibers and types of handguns.

4. The elongated stem of claim 3, wherein the elongated stem contains a plurality of contact beads in a helical configuration for frictional engagement and proper alignment in the barrel of the handgun.

5. The contact beads of claim 4, wherein the contact beads are a brass material for protection of the handgun barrel.

6. The laser firearm training device of claim 1, wherein the spud adapter is an aluminum material.

7. The laser training device of claim 1, wherein the micro-switch is disposed within a trigger ring attached at the second end of the electrical lead, the trigger ring is positioned on a trigger finger of a user causing activation by compressing the micro-switch against the trigger of the handgun.

8. The laser firearm training device of claim 1, wherein the micro-switch is disposed on a trigger hook having an attachment means to a trigger guard of the handgun for positioning of the micro-switch against the trigger.

\* \* \* \* \*